United States Patent Office 3,189,471
Patented June 15, 1965

3,189,471
HIGH TENSILE STRENGTH MAGNESIUM ALUMINUM SILICATE GLASS COMPOSITIONS
George L. Thomas, Parma, Ohio, assignor to The B. F. Goodrich Company, New York, N.Y., a corporation of New York
No Drawing. Filed May 11, 1962, Ser. No. 194,156
6 Claims. (Cl. 106—50)

This invention relates to a magnesium aluminum silicate glass composition to be used principally for glass fibers. The glass composition of this invention has fiber spinning properties comparable to a sodium calcium silicate glass and also to the borosilicate glass composition commonly known in the trade as E glass, yet, fibers spun from this new glass composition have an average tensile strength of at least 30% to 60% greater than the tensile strength of E glass fibers of corresponding gauge.

Because of this substantial improvement in tensile strength, fibers made from the glass composition of this invention are especially useful for the manufacture of glass reinforced plastic articles and particularly filament wound glass-plastic pressure vessels. Moreover, resin-glass composites of these high strength glass yarns have been found to be at least 30% to 50% better in tensile strength than corresponding identically processed resin-glass composites of E glass yarn.

The glass compositions disclosed can be melted at 2600° F. to 2700° F., formed into marbles and drawn into fibers by conventional methods. Fibers formed from my new glass find ready application in articles where a high strength to weight ratio is important. Pressure bottles and tanks to hold liquids and gases, particularly under high pressures, are widely used in aircraft to store oxygen, hydraulic fluid, deicing fluid and the like, and any new material which will make a stronger article for the same weight, or a lighter article with the same strength as can be made with presently used materials finds ready interest and acceptance.

While I have succeeded in making a glass composition of extremely high tensile strength, my glass composition also has good spinning characteristics for drawing into continuous filament glass. It has a long working range of approximately 250° F. which is necessary for commercial processing.

My new glass exhibits a Young's modulus of about $13 \times 10^6$ p.s.i. in the uncompacted fiber which is an impressive increase over the modulus of commercial continuous filament fiber glass which is about $11 \times 10^6$ p.s.i. A high modulus or stiff glass is desirable when the fibrous glass is to be used for plastic reinforcement.

This glass has liquidus temperature lower than 2300° F., so that it can be spun under ordinary spinning conditions without the use of special nozzles, cooling or handling. It shows little tendency to devitrify under spinning conditions.

The great strength of my glass is believed to be due to its composition. A glass with high tensile strength, long spinning range, low liquidus temperature, slow rate of crystallization and increased Young's modulus may be made in the following composition range.

| Ingredient: | Proportion |
|---|---|
| $SiO_2$ | 50.0–64.0 |
| $Li_2O$ | 0.1–3.0 |
| $Al_2O_3$ | 18.0–30.0 |
| $MgO$ | 11.0–23.0 |
| $B_2O_3$ | 0.0–4.9 |
| $Sb_2O_3$ | 0.0–1.0 |
| $Fe_2O_3$ | 0.0–1.0 |
| $Al_2O_3/MgO$ | 1.0–2.2 |

As is common in glass technology, the ingredients are given above in terms of oxides of the elements. The compounds may be added to the glass batch in several different forms, however. Lithium may be added as carbonate, as can magnesium for example.

Silica is an essential component of this glass since it is the glass forming oxide. A small amount of $B_2O_3$ is preferred in this glass composition, and in the amount in which it is used, it is considered to be a fluxing and refining agent, not a glass forming oxide. When $B_2O_3$ is added to the glass, the strength is improved over that of a glass with no $B_2O_3$. The preferred $B_2O_3$ content is about 0.4% to 3.5%, but glass with tensile strengths greater than those for comparable E glass can be made with amounts of $B_2O_3$ up to about 5% and as low as a trace, or even 0%.

The alkali oxide is employed as a flux in the glass. Lithia has a small ionic radius and relatively high field strength for alkali ions. Experiments have shown that in these magnesium aluminum silicate glasses the preferred $Li_2O$ content is between 0.5% and 2.5% but glasses of relatively high tensile strength compared to E glass have been made using amounts of lithia both slightly above and below these limits. Soda ($Na_2O$) and potassium oxide may be used in combination with lithia or alone to lower the materials cost of the glass and to help the fluxing properties, but best results are obtained with lithia alone.

A very common ingredient of silicate glasses is CaO. It generally contributes to stability and durability of the glass, serves as a flux and helps to lower viscosity and increase fluidity of the glass batch. I have discovered that in the glasses of this invention, calcia is detrimental and is preferably not to be used at all. It tends to lower tensile strength and modulus of elasticity and to raise the liquidus temperature.

Magnesia is required to reduce viscosity and avoid devitrification of the glass batches. A high alumina content contributes to durability, but in glass with high alumina it is hard to introduce magnesia in the absence of calcia because the glass is stiff and requires very high melting temperatures. These conditions can lead to stones in the glass caused by the magnesia and the glass will have a tendency to devitrify. The addition of iron oxide helps to dissolve magnesia in high alumina glass in the absence of calcia. The combination of magnesia and iron oxide gives the glass a long working range and allows spinning from commercial spinning units to form continuous filament glass fiber.

Antimony oxide improves homogeneity of the glass by aiding mixing early in the melt period, reduces gas bubbles and acts to improve the working properties of the glass.

The high alumina content of this glass is believed to be important in the attainment of the high tensile strength developed. Incorporating such high amounts of alumina in a glass is difficult, since it tends to cause devitrification at the low temperatures employed for spinning. The successful results I have achieved are believed to be due to the use of the proper oxides and the correct proportioning of all the constituents. An unusual feature of these glasses is believed to be the high amounts of MgO and $Al_2O_3$ employed in a silicate system (one which is at least 50% $SiO_2$ by weight).

In order to produce the strong glass compositions of this invention, it is important that I control the $Al_2O_3$/MgO ratio between 1.0 and 2.2. Ratios above and below this range have been found to produce glasses of lower tensile strengths, although it is noted that even these lower strength magnesium aluminum silicate glasses are as strong as commercial E glass which is the present day standard.

The glass of this invention has a tensile strength superior to that of commercially available filament glasses and an improved Young's modulus. It melts readily in existing glass melting units, and is easily spun in ordinary platinum type spinning units.

To compare various batches of my glass with each other and with continuous filament E glass, I have employed a single filament tensile test as follows:

The glass batch is mixed, melted at 2675° F. in a platinum lined 500 cc. alumina crucible set inside an electrically heated Pereny furnace and formed into cullet. The cullet is remelted at about 2500° F. in a platinum bushing and drawn through the single platinum nozzle. The same nozzle and drawing speeds are employed in all cases. The filament is drawn at the rate of 5,000 feet per minute; and a length of approximately 10" of filament is cut from the section between the nozzle and the drawing wheel during spinning. The sample is mounted on a cardboard containing 5 one inch openings along the length of the filament. The filament ends overlapping the end of the cardboard are removed and checked for diameter under a microscope. They should agree within 0.00002 inch. The filament is glued to the cardboard at the end of each opening and the cardboard is cut transversely to the filament between the openings to give 5 one inch lengths of filament which can be mounted in an Instron Testing Machine for tensile test. With every group of experimental filaments a control group of commercial E glass filaments is run.

In another evaluation test for the glass fibers, a 204 filament yarn is prepared, coated with a resin compatible finish, dried, twisted, coated with an epoxy resin, and broken in tension on the Instron Tensile Testing Machine. In making the glass marbles are melted at about 2500° F. and spun from a 204 hole platinum bushing. At a point about 4 feet below the nozzles where the filaments converge to form a roving, the finish is applied by running the glass filaments over a finish impregnated felt pad at 7000 per minute. The roving is dried in an oven for about 5 hours at 180° F. The dried, finish-coated roving is then given a twist of one turn per inch. Now the material is called yarn.

The resin compatible finish applied to the glass yarn consists of:

Gamma-aminopropyltriethoxy silane _____ml__ 450
62% solids mixture of 65 parts polyvinyl acetate
  +35 parts polyester plasticizer believed to be dissolved in methylethyl ketone _____ml__ 2800
56% solids polyvinyl acetate believed to be dissolved in methylethyl ketone _____ml__ 4000
Water _____liters__ 36

The epoxy resin applied to the finish coated glass yarn consists of:

Parts
Epoxy resin (diglycidal ether of bisphenol A, mol wt. 360–380) _____ 90
Epoxy resin (diepoxy resin with mol wt. of 950 to 1150 and low number of cross links per molecule)__ 10
Metaphenylenediamine _____ 13

The resin is applied by running the finish coated yarns through a container of resin at room temperature. The resin is then cured in an oven at 200° F. for about 2 hours.

When the samples are broken in tension on the Instron Tensile Machine, the results show the glasses of this invention to have 30% to 50% higher strength than E glass yarn processed in the same manner.

Young's modulus is run on the uncompacted fiber by a standard sonic method utilizing measurement of the speed of a sound transmitted through the glass. This method is described in J. App. Physics, 20, 493 (1949).

The glass composition of my invention is illustrated by the following examples wherein the ingredients are proportioned by weight.

EXAMPLES I–X

Batches were mixed according to the following oxide compositions, melted in a small 200 lb. capacity day tank at 2675° F. and formed into marbles. The marbles were remelted in platinum bushings and drawn into both single filament and 204 filament form. The two types of filaments were processed as described above. Glass compositions and test data are summarized in Table 1. Standard E glass was employed as the control.

*Table 1*

| Oxides | Ex. I | Ex. II | Ex. III | Ex. IV | Ex. V | Ex. VI | Ex. VII | Ex. VIII | Ex. IX | Ex. X |
|---|---|---|---|---|---|---|---|---|---|---|
| $SiO_2$, percent | 62.7 | 59.3 | 61.1 | 58.3 | 54.8 | 61.2 | 54.7 | 58.7 | 55.8 | 53.6 |
| $Li_2O$, percent | 1.2 | 0.4 | 1.24 | 1.3 | 2.0 | 1.3 | 2.0 | 1.3 | 1.3 | 3.4 |
| $Al_2O_3$, percent | 18.6 | 20.9 | 19.4 | 24.2 | 28.7 | 23.7 | 21.0 | 11.0 | 23.1 | 27.4 |
| MgO, percent | 14.6 | 16.4 | 15.2 | 12.8 | 13.0 | 12.5 | 19.6 | 26.0 | 12.2 | 12.8 |
| $B_2O_3$, percent | 1.8 | 2.0 | 1.86 | 2.2 | 1.0 | 0.1 | 2.7 | 2.0 | 6.4 | 2.8 |
| $Sb_2O_3$, percent | 0.6 | 0.5 | 0.7 | 0.7 | 0.5 | 0.7 | | 0.5 | 0.7 | |
| $Fe_2O_3$, percent | 0.5 | 0.5 | 0.5 | 0.5 | | 0.5 | | 0.5 | 0.5 | |
| $Al_2O_3/MgO$, percent | 1.28 | 1.27 | 1.21 | 1.88 | 2.20 | 1.88 | 0.94 | 2.35 | 1.88 | 2.14 |
| Liquidus temp., °F | 2,240 | 2,320 | 2,260 | 2,320 | 2,330 | | 2,250 | 2,370 | 2,260 | |
| Average single filament tensile strength, p.s.i. × 10³; E glass=400 | 639 | 590 | 635 | 663 | 541 | 574 | 508 | 518 | 518 | 494 |
| Average 204 filament tensile strength epoxy resin coat, p.s.i. × 10³; E glass=345 | 425 | | 437 | 448 | | | | | | |

Examination of Table 1 shows that when glass compositions are made from the specific materials and in the specific ranges and combinations of those materials that I have suggested, filament glass of much greater strength than E glass is obtained. In Examples I–VI, average single filament tensile strengths of 135% to 166% of that of E glass were developed. In the epoxy resin coated glass yarns, my glasses developed strengths equal to 123% to 130% of that of E glass.

Examples VII and VIII illustrate that $Al_2O_3/MgO$ ratios above and below the critical range of 1.0 to 2.2 give glasses materially weaker than the favored glasses, but still stronger than comparable E glass.

Example IX shows that increasing the amount of boric oxide above 4.9%, the amount where it ceases to be a refining agent and becomes a glass former, does not produce the very high strength glass of my invention.

Example X shows that too much $Li_2O$ in the glass tends to detract from the tensile strength developed in the continuous filament form.

I claim:
1. A glass composition, employing $B_2O_3$ as a flux, for high tensile strength glass fiber consisting of:

| | |
|---|---|
| $SiO_2$ | 50.0–64.0 |
| $Li_2O$ | 0.1–2.5 |
| $Al_2O_3$ | 18.0–30.0 |
| MgO | 11.0–23.0 |
| $B_2O_3$ | 0.0–4.9 |
| $Sb_2O_3$ | 0.0–1.0 |
| $Fe_2O_3$ | 0.0–1.0 | parts by weight with the ratio $Al_2O_3/MgO$ in the range of 1.0–2.2, said fiber having a tensile strength from about 541,000 to 663,000 p.s.i.

2. A glass composition, employing $B_2O_3$ as a flux for high tensile strength glass fiber consisting of:

| | Percent |
|---|---|
| $SiO_2$ | 62.7 |
| $Li_2O$ | 1.2 |
| $Al_2O_3$ | 18.6 |
| $MgO$ | 14.6 |
| $B_2O_3$ | 1.8 |
| $Sb_2O_3$ | 0.6 |
| $Fe_2O_3$ | 0.5 |
| $Al_2O_3/MgO$ | 1.28 | said fiber having a tensile strength from about 541,000 to 663,000 p.s.i.

3. A glass composition employing $B_2O_3$ as a flux for high tensile strength glass fiber consisting of:

| | Percent |
|---|---|
| $SiO_2$ | 59.3 |
| $Li_2O$ | 0.4 |
| $Al_2O_3$ | 20.9 |
| $MgO$ | 16.4 |
| $B_2O_3$ | 2.0 |
| $Sb_2O_3$ | 0.5 |
| $Fe_2O_3$ | 0.5 |
| $Al_2O_3/MgO$ | 1.27 | said fiber having a tensile strength from about 541,000 to 663,000 p.s.i.

4. A glass composition employing $B_2O_3$ as a flux for high tensile strength glass fiber consisting of:

| | Percent |
|---|---|
| $SiO_2$ | 61.1 |
| $Li_2O$ | 1.24 |
| $Al_2O_3$ | 19.4 |
| $MgO$ | 15.2 |
| $B_2O_3$ | 1.86 |
| $Sb_2O_3$ | 0.7 |
| $Fe_2O_3$ | 0.5 |
| $Al_2O_3/MgO$ | 1.21 | said fiber having a tensile strength from about 541,000 to 663,000 p.s.i.

5. A glass composition employing $B_2O_3$ as a flux for high tensile strength glass fiber consisting of:

| | Percent |
|---|---|
| $SiO_2$ | 58.3 |
| $Li_2O$ | 1.3 |
| $Al_2O_3$ | 24.2 |
| $MgO$ | 12.8 |
| $B_2O_3$ | 2.2 |
| $Sb_2O_3$ | 0.7 |
| $Fe_2O_3$ | 0.5 |
| $Al_2O_3/MgO$ | 1.88 | said fiber having a tensile strength from about 541,000 to 663,000 p.s.i.

6. A glass composition employing $B_2O_3$ as a flux for high tensile strength glass fiber consisting of:

| | Percent |
|---|---|
| $SiO_2$ | 54.8 |
| $Li_2O$ | 2.0 |
| $Al_2O_3$ | 28.7 |
| $MgO$ | 13.0 |
| $B_2O_3$ | 1.0 |
| $Sb_2O_3$ | 0.5 |
| $Fe_2O_3$ | --- |
| $Al_2O_3/MgO$ | 2.20 | said fiber having a tensile strength from about 541,000 to 663,000 p.s.i.

References Cited by the Examiner

UNITED STATES PATENTS

| 3,044,888 | 7/62 | Provance | 106—50 |
| 3,095,311 | 6/63 | Von Wranau et al. | 106—50 |
| 3,117,881 | 1/64 | Henry et al. | 106—39 |

FOREIGN PATENTS

| 124,553 | 6/47 | Australia. |
| 765,244 | 1/57 | Great Britain. |
| 163,590 | 6/58 | Sweden. |

OTHER REFERENCES

Osborn et al.: "Phase Equilibrium Diagrams of Oxide Systems—Plate 3— $MgO$—$Al_2O_3$—$SiO_2$," published 1960 by American Ceramic Society, Columbus, Ohio.

Lajarte: German application, 1,088,675, printed Sept. 8, 1960 (Kl 32bl), 4 pages spec.

Karkhanavala et al.: "Reactions in the System $Li_2O$—$MgO$—$Al_2O_3$—$SiO_2$: I, The Cordierite-Spodumene Join" (page 394), J. Amer. Cer. Soc., Dec. 1953.

TOBIAS E. LEVOW, *Primary Examiner.*